United States Patent
Wagner et al.

(10) Patent No.: US 9,409,112 B2
(45) Date of Patent: Aug. 9, 2016

(54) AIR FILTER ELEMENT

(71) Applicant: MANN+HUMMEL GMBH, Ludwigsburg (DE)

(72) Inventors: Fabian Wagner, Moeglingen (DE); Michael Maier, Reisbach (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 67 days.

(21) Appl. No.: 14/330,029

(22) Filed: Jul. 14, 2014

(65) Prior Publication Data

US 2015/0013293 A1    Jan. 15, 2015

(30) Foreign Application Priority Data

Jul. 12, 2013    (DE) .......................... 10 2013 011 609

(51) Int. Cl.
  *B01D 46/00* (2006.01)
  *B01D 46/10* (2006.01)
  *B01D 46/52* (2006.01)

(52) U.S. Cl.
  CPC ............ *B01D 46/0005* (2013.01); *B01D 46/10* (2013.01); *B01D 46/521* (2013.01); *B01D 2271/02* (2013.01); *B01D 2271/022* (2013.01)

(58) Field of Classification Search
  CPC ........... B01D 46/0002; B01D 46/0005; B01D 46/10; B01D 2271/02; B01D 2271/022; B01D 46/521
  See application file for complete search history.

(56) References Cited

U.S. PATENT DOCUMENTS

| | | | | |
|---|---|---|---|---|
| 5,569,311 | A  * | 10/1996 | Oda .................... | B01D 46/0002 55/493 |
| 8,152,876 | B2 | 4/2012 | Gillenberg et al. | |
| 8,778,043 | B2 | 7/2014 | Krisko et al. | |
| 2002/0036165 | A1* | 3/2002 | Sommer ............ | B01D 46/2414 210/438 |
| 2003/0177745 | A1* | 9/2003 | Jauw .................. | B01D 46/0005 55/497 |
| 2003/0217534 | A1* | 11/2003 | Krisko .................. | B01D 45/12 55/337 |
| 2005/0229563 | A1* | 10/2005 | Holzmann ......... | B01D 46/2414 55/502 |
| 2009/0145093 | A1 | 6/2009 | Krisko et al. | |

* cited by examiner

*Primary Examiner* — Robert Clemente
(74) *Attorney, Agent, or Firm* — James Hasselbeck

(57) ABSTRACT

An air filter element has a filter means and a circumferential plastic frame with a sealing element, which encompasses a laterally outwardly projecting border of the plastic frame in a U-shaped manner. The sealing element is one piece with a circumferential sealing lip that is arranged on a side flank of the U-shaped sealing section.

8 Claims, 4 Drawing Sheets

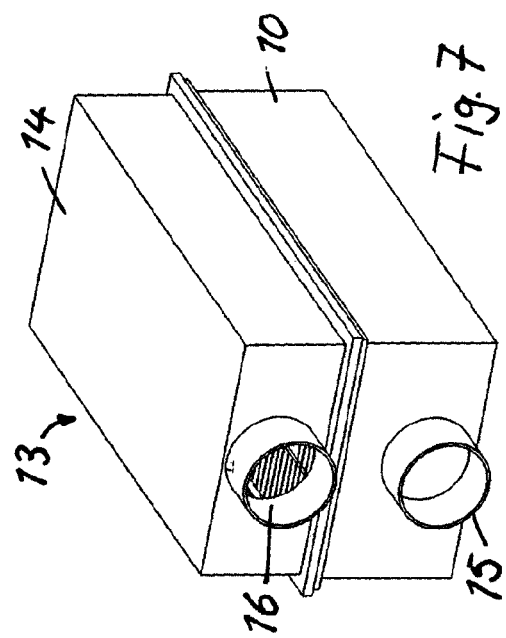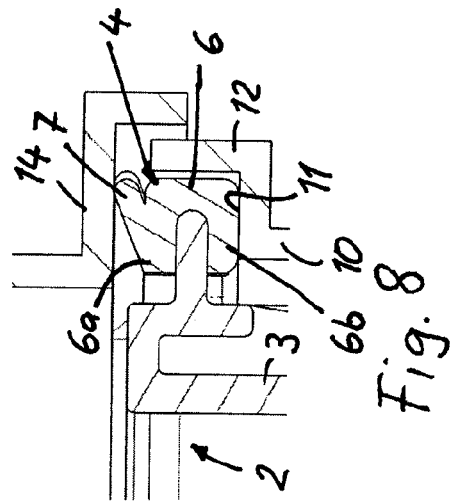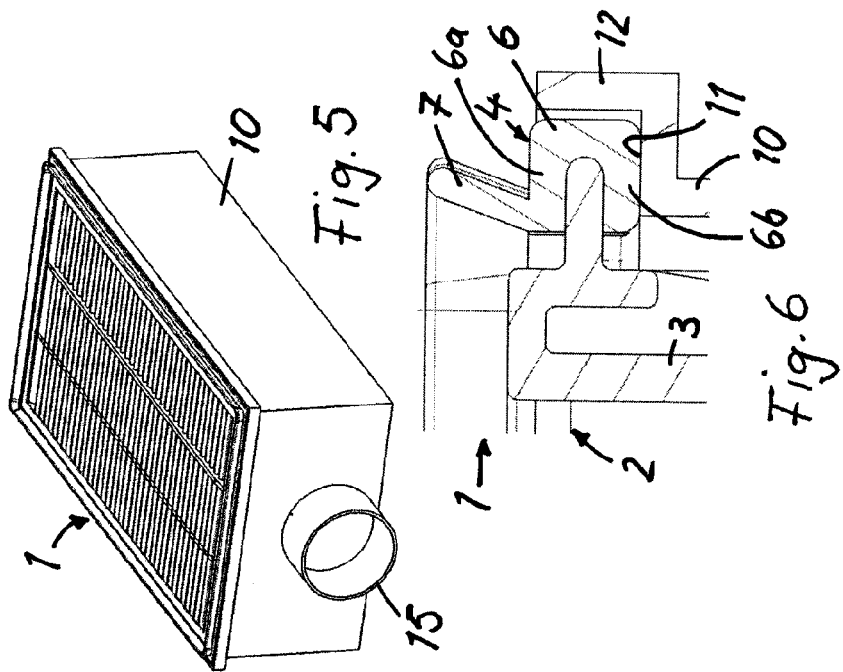

AIR FILTER ELEMENT

CROSS-REFERENCE TO RELATED APPLICATION

This application claims the benefit of German patent application No. 10 2013 011 609.0, filed Jul. 12, 2013, the aforesaid German patent application being incorporated in its entirety herein by reference.

TECHNICAL FIELD

The invention relates to an air filter element according to the preamble of claim 1.

BACKGROUND

EP 1 464 372 B1 describes an air filter with an air filter element for inserting into a housing. The filter medium of the air filter element is designed in a panel-shaped manner and constructed as a pleated filter. The filter element is enclosed by a circumferential sealing element, which surrounds the circumferential edge of the filter element and, in an inserted state, abuts in a sealing manner against the inner wall of the accommodating housing. The sealing element has two sealing lips oriented upward at an angle, which abut in a sealing manner on the bottom side of an emplaced housing cover. A flank of the sealing element projects laterally outward and forms together with another flank abutting the side of the sealing element an L-shaped section, which abuts a correspondingly formed L-shaped shoulder of the housing wall. The shoulder of the housing simultaneously forms a support surface for the emplaced housing cover.

For a secure connection of the sealing element to the filter element, groove-shaped recesses, into which the sealing element is injected, are inserted into the filter element next to the side edge.

SUMMARY OF THE INVENTION

The object of the invention is to separate the clean side from the dirty side of an air filter element in a flow-tight manner with simple design measures.

The air filter element according to the invention is inserted in an air filter that is integrated for example in the intake passage of an internal combustion engine. However, applications of air filters in other technical fields are also possible, for example to purify breathing air in vehicle or aircraft cabins.

The air filter element has a filter medium through which the air to be purified passes. The filter medium is enclosed by a plastic frame, on which is arranged a circumferential sealing element. For practical purposes, the plastic frame also runs around the filter medium of the filter element and surrounds the filter element. According to another appropriate embodiment, the sealing element is held solely on the plastic frame, wherein designs are also possible in which the sealing element is not only held on the plastic frame, but also abuts directly on the filter medium and is held by it.

On the plastic frame, there is arranged a border pointing laterally outward away from the filter medium, which is encompassed in a U-shaped manner by a section of the sealing element. In addition, a circumferential sealing lip is formed as one piece with the sealing element, said sealing lip being arranged on a side flank of the U-shaped section and rising above the side flank.

With this design, various advantages are achieved. On the one hand, the result is a firm and permanent connection between the sealing element and the plastic frame, and thus also to the filter medium. The U-shaped section mechanically encompasses the border on the plastic frame in a form-fitting manner, if applicable also in a chemically material-bonded manner, and is securely held on the plastic frame. On the other, a side flank of the U-shaped section forms a seal or contact surface, with which the sealing element abuts the wall of the receiving filter housing in an elastically forgiving manner. On the one hand, this improves sealing effect; on the other, forces during assembly as a result of inserting the filter element into the filter housing and emplacing a housing cover are damped by the elasticity of the damping material. The circumferential sealing lip hereby abuts the inner side of the housing cover, which is emplaced on the filter housing. The U-shaped sealing section and the sealing lip, which is formed in a one-piece manner with the U-shaped sealing section, ensure a reduction of the forces when emplacing and closing the housing cover on the filter housing.

The sealing element also has a simple cross-sectional geometry and can be manufactured in a correspondingly simple manner.

According to an advantageous embodiment, the sealing element is injected on to the outwardly projecting border of the plastic frame. Falling under consideration as material for the sealing element is TPU (thermoplastic polyurethane) or TPV (vulcanized thermoplastic elastomer) for example. The TPUs or TPVs can be in a foam state if applicable. The foam structure may have a closed surface.

In contrast to a PU foam, which must be pressed in when closing the housing cover, to meet the sealing requirements, which is associated with high closing forces, in the design, according to the invention, of the sealing element, the forces required to close the housing cover are substantially reduced due to the geometric design with the U-shaped sealing section and fitted sealing lip in conjunction with the TPU or TPV material of the sealing element, which substantially decreases the forces required to close the housing cover. This simplifies the assembly of the air filter as well as the changing of the air filter element in the case of maintenance.

The sealing lip constructed in a one-piece manner also offers considerable tolerance compensation so that housing tolerances can be better compensated for.

According to another appropriate embodiment, the sealing lip has an angle in relation to an orthogonal to the plane of the side flank of the U-shaped section, said angle amounting appropriately to at least 15°. The side flanks extend transversely, following the contour of the border of the plastic frame, in relation to the wall plane of the filter housing. The orthogonal to the plane of the side flanks accordingly runs parallel to the wall plane of the filter housing wall. In an un-deformed state, the sealing lip thus has an angle of at least 15° in relation to the plane of the wall of the filter housing. The angle lies for example in a range between 15° and 60°, wherein if applicable an orthogonal extension of the sealing lip to the side flank also comes under consideration, in other words an extension parallel to the wall plane of the filter housing wall. In an angled design of the sealing lip, emplacing the housing cover clearly defines the deformation direction of the sealing lip. In an un-deformed state, the sealing lip with its free front face extends with a directional component appropriately in an outward direction so that when emplacing the housing cover, a deformation of the sealing lip results in an outward direction.

The air filter element can be designed as a panel filter, i.e., the filter element extends in a plane and does not enclose an interior hollow space like a round filter for example. The panel filter can be polygonal, preferably rectangular. Also coming under consideration are non-angular designs, for example round panel filters, e.g., oval, drop-shaped panel filters. The plastic frame preferably encircles the panel filter in its extension plane.

The filter medium can be designed as a pleated filter. In particular, in the event of a pleated filter element designed as a panel filter, the surrounding plastic frame serves to laterally seal off the pleat pockets.

Preferably, the sealing lip extends along the straight or curved sides of the air filter element and has in the transition between two angularly adjoining sides a compensation section designed in an extended manner. The compensation section is advantageously designed in a partially circular, if applicable elliptical or curved, manner and connects angularly adjoining straight or curved sealing lip sections on various sides to each other. The lengthened compensation section allows the sealing lip sections at the various sides to be pressed outward when placed under pressure by the housing cover; the compensation section is hereby lengthened so that despite the sealing lip being bent over in an outward direction, a continuous and flow-tight connection between the sealing element and the overlying housing cover is formed.

The air filter comprises the air filter element and a filter housing into which the air filter element is inserted. The filter housing is to be sealed by the housing cover. The sealing element abuts the filter housing with one of the side flanks of the U-shaped section, and the housing cover with the sealing lip. According to an expedient design, the filter housing has, next to its front face, a laterally projecting support shoulder on which lies, in an assembled state, a side flank of the U-shaped sealing section. The support shoulder also absorbs the closing forces of the emplaced housing cover. The support shoulder appropriately has on its radially external side a wall positioned in a bounding manner, on whose inner side the sealing element abuts.

Essentially also coming under consideration is a reverse design in which the sealing element abuts the housing cover with one of the side flanks of the U-shaped section, and the filter housing with the sealing lip.

BRIEF DESCRIPTION OF THE DRAWINGS

Additional advantages and appropriate designs are disclosed in the other claims, the diagram descriptions, and drawings.

FIG. 5 depicts a perspective view of the air filter element inserted in a filter housing.

FIG. 6 depicts a cross-section from the side region of the air filter element inserted in the filter housing.

FIG. 7 depicts the air filter with a filter housing and an emplaced housing cover.

FIG. 8 depicts a cross-section through the side region of the air filter in an assembled state, including the filtering housing and housing cover.

Figure 1:
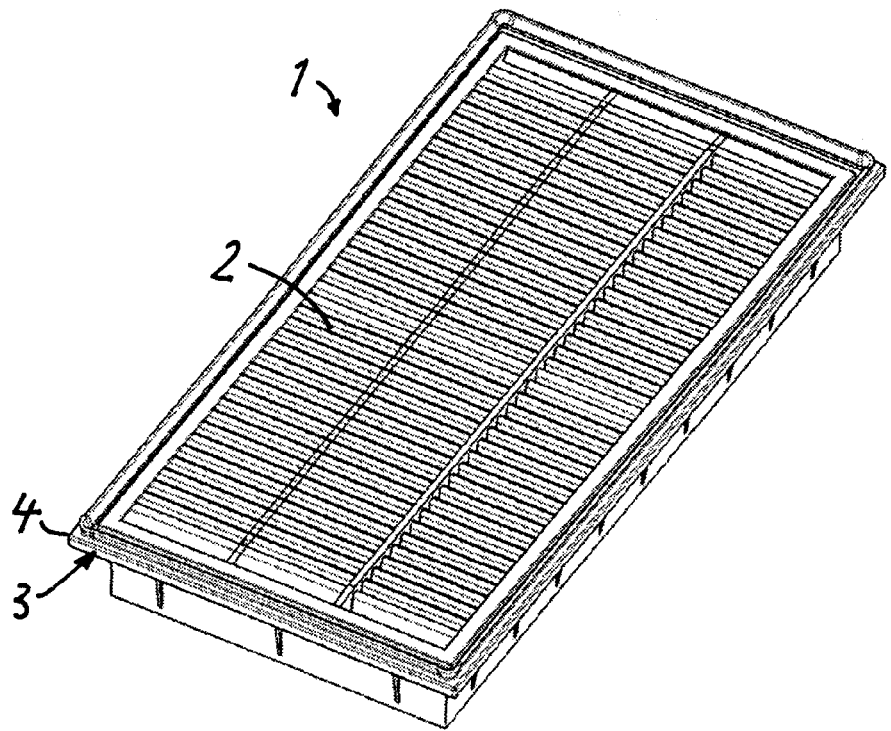
FIG. 1 depicts a perspective view of an air filter element, with a panel-shaped, rectangular filter medium that is enclosed by a plastic frame with a sealing element.

In the drawings, the same components are labeled with the same reference signs.

DETAILED DESCRIPTION OF THE INVENTION

FIG. 1 depicts an air filter element 1, which is used for example in the intake passage of an internal combustion machine for filtering supplied combustion air. Air filter element 1 has a panel- and rectangle-shaped filter medium 2, which is designed as a pleated filter and is bordered by a plastic frame 3. Plastic frame 3 forms the lateral seal of the pleat pouches. In addition, it is the carrier of a sealing element 4, which is held exclusively on plastic frame 3 and can be injected on to plastic frame 3. Sealing element 4 consists for example of a TPU (thermoplastic polyurethane) or a TPV (vulcanized thermoplastic elastomer).

Figure 2:
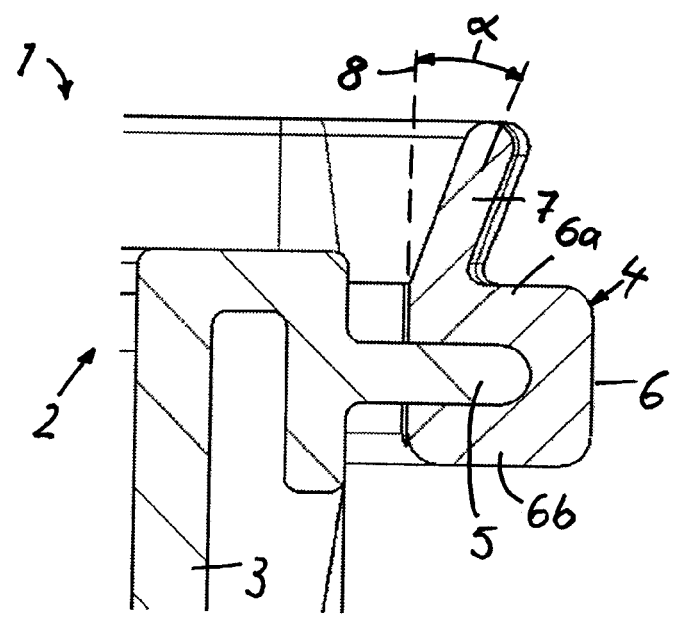
FIG. 2 depicts a cross-section through the air filter element in the side region.

As one can see in FIG. 2, a border 5 protruding laterally outward is formed in one piece on to plastic frame 3, said border on the side facing away from filter medium 2 extending horizontally outward. Border 5 of plastic frame 3 is enclosed by a U-shaped sealing section 6 of sealing element 4. Formed as one piece with U-shaped sealing section 6 is a sealing lip 7 of the sealing element, said lip extending upward from the upper side flank 6a of U-shaped sealing section 6 and oriented at an angle α of approx. 20° to the orthogonal 8, which lies perpendicular to the plane of side flank 6a, 6b and the plane of the laterally protruding border 5. Sealing lip 7 is hereby inclined outwardly. U-shaped sealing section 6 and sealing lip 7 are designed circumferentially and enclose filter medium 2 in a frame-like manner.

Figure 3:
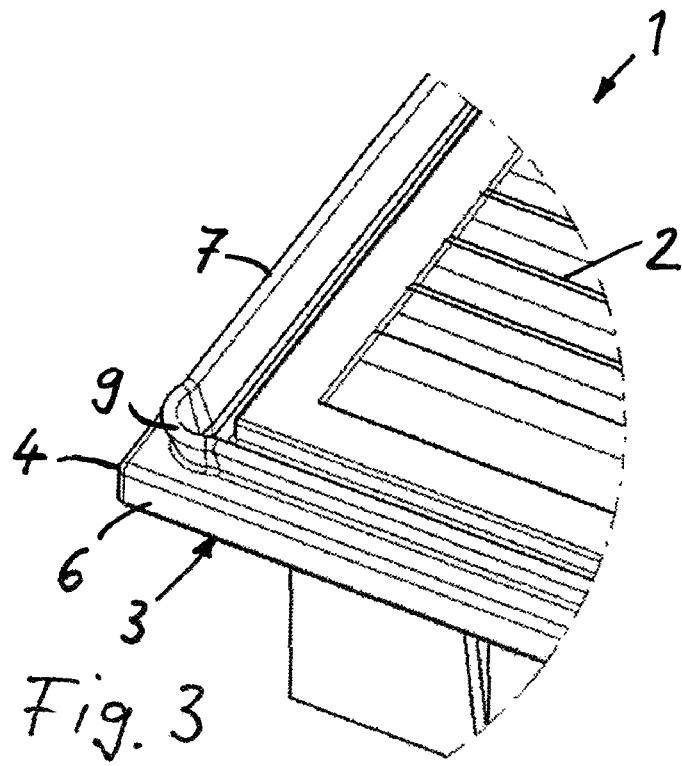
FIG. 3 depicts a perspective view of the corner region of the air filter element with a partially circular compensation section for connecting two straight sealing lip sections of the sealing element.
Figure 4:
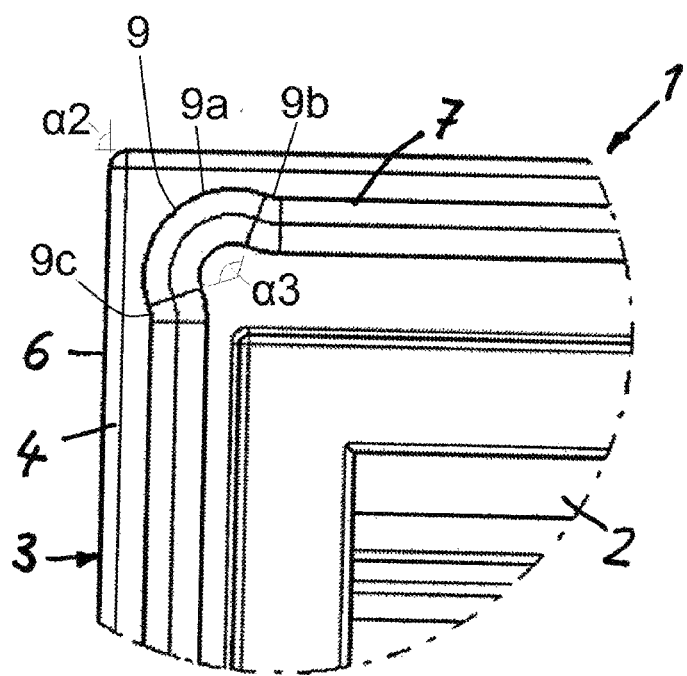
FIG. 4 depicts the corner region of the air filter element from a top view.

As one can see in FIGS. 3 and 4, sealing lip 7 extends along the sides of filter medium 2 in a straight manner, wherein the sections of sealing lip 7 are connected to each other in the corner region by means of a partial circle-shaped compensation section 9. Compensation section 9 is designed in an extended manner and has a greater length than would be necessary in the un-deformed state of the sealing element for connecting the straight sealing lip sections. Due to the elongated design of compensation section 9, it is possible that sealing lip 7 in all of its sections, when placed under pressure by a housing cover from above, deforms outwardly, whereby compensation section 9 is stretched. Compensation section 9 thus allows the bending-over of the sealing lip in an outward direction while avoiding high loads in the transition between the straight sections, which otherwise would result in the risk of a tear. As shown in FIG. 4, the compensation section 9 has a first compensation section 9a in the form of a partial circle, arc or ellipse, the first compensation section curving laterally outwardly forming a convex outwardly bulging protrusion of the sealing lip 7. The first compensation section 9a sweeps an angle α3 that is greater than an angle α2 at which the two angularly adjoining sides of the air filter element meet. On opposing ends of the first compensation section 9a are second compensation sections 9b, 9c in the form of partial circle, arc or ellipse, the second compensation sections 9b, 9c curving laterally inwardly. As can be seen in FIG. 4, the second compensation sections 9b, 9c of the compensation section 9 compensate for the angular difference between the first compensation section sweep angle α3 and the angle α2 between the two angularly adjoining sides.

FIGS. 5 and 6 depict air filter element 1 in accommodating filter housing 10. On the exterior wall of accommodating filter housing 10, there is formed a laterally projecting support shoulder 11, which forms a contact and support surface for the lower side flank 6b of the U-shaped seal section of sealing element 4. Support shoulder 11 is bordered radially outward by a rising partition wall 12, on which is supported the bottom of U-shaped sealing section 6, which connects the two side flanks 6a and 6b to each other.

FIG. 7 depicts air filter 13 with filter housing 10, accommodating the filter element, and an emplaced housing cover 14. Filter housing 10 and housing cover 14 have flow openings 15 and 16 for the intake and discharge of combustion air before and after filtration in the filter element.

As one can see from the cross-sectional representation according to FIG. 8, sealing lip 7 of sealing element 4 is bent over outwardly by emplaced housing cover 14. There is a flow-tight closure between U-shaped sealing section 6 and filter housing 10 on the one hand, and between sealing lip 7 and housing cover 14 on the other. In this way, the clean and dirty sides of the filter element are separated in a flow-tight manner.

Figure 9:
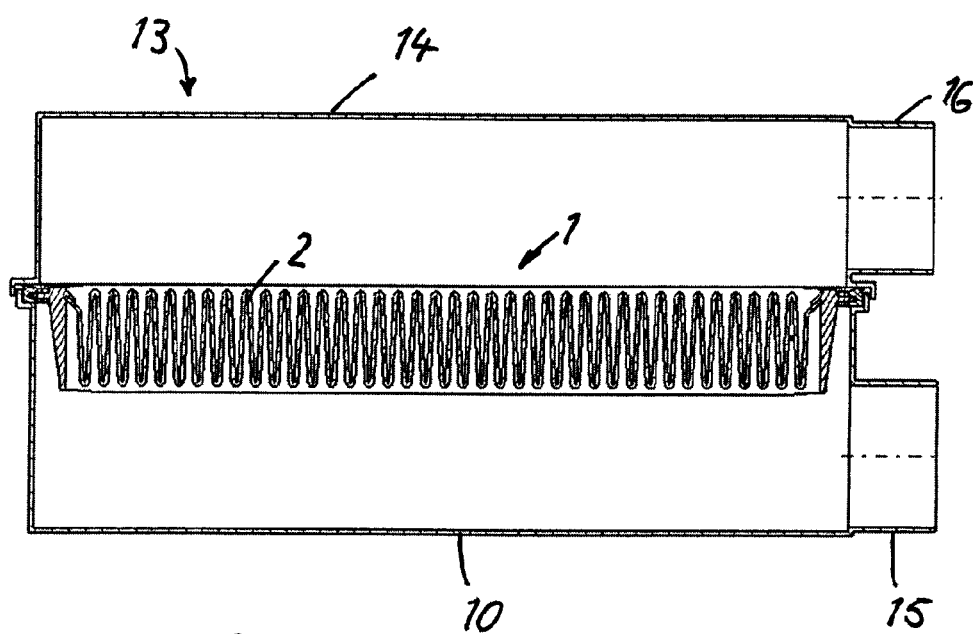
FIG. 9 depicts a lengthwise cross-section through the air filter.

FIG. 9 depicts a longitudinal cross-section through air filter 13 with an air filter element 1 inserted in it [sic] in filter housing 10 as well as with an emplaced housing cover 14. The flow spaces below and above air filter element 1 are separated from each other inside the housing in a flow-tight manner. Housing cover 14 is affixed to filter housing 10 by means of suitable connection elements, for example by means of snap-clasps.

The invention claimed is:

1. An air filter element, comprising:
    a filter medium,
    a surrounding sealing element,
    wherein the sealing element is held on to a plastic frame,
    wherein a laterally outward protruding border of the plastic frame is encompassed by a section of the sealing element in a U-shaped manner, and
    that a circumferential sealing lip is unitary one piece with the sealing element,
    said sealing lip being arranged on a side flank of the U-shaped sealing section and rising over the side flank,
    wherein the sealing lip has an angle of at least 15 degrees in relation to the orthogonal to a plane of side flank of the U-shaped sealing section,
    wherein the sealing lip along each side of the air filter element is designed in a straight or curved manner and has a compensation section designed in an elongated manner in the transition between two angularly adjoining sides of the air filter element,
    wherein the compensation section of the circumferential sealing lip includes:
        a first compensation section in the form of partial circle, arc or ellipse, the first compensation section curving laterally outwardly on the laterally outward protruding border of the plastic frame forming a convex protrusion, the first compensation section sweeping an angle $\alpha 3$ that is greater than an angle $\alpha 2$ at which the two angularly adjoining sides of the air filter element meet,
        at least one second compensation section in the form of partial circle, arc or ellipse arranged at an end of the first compensation section, the second compensation section curving laterally inwardly on the laterally outward protruding border of the plastic frame,
        wherein the at least one second compensation section compensates for an angular difference between $\alpha 3$ and $\alpha 2$.

2. The air filter element according to claim 1, wherein the air filter element is characterized by a polygonal or a rectangular design.

3. The air filter element according to claim 1, wherein the filter medium is pleated.

4. The air filter element according to claim 1, wherein the sealing element is arranged at, secured onto and injected onto the border of the plastic frame.

5. The air filter element according to claim 1, wherein the sealing element is a TPU (thermoplastic polyurethane) or a TPV (vulcanized thermoplastic elastomer).

6. The air filter element according to claim 1, wherein the sealing element is formed by a foamed material.

7. An air filter comprising
an air filter element including:
    a filter medium,
    a surrounding sealing element,
    wherein the sealing element is held on to a plastic frame,
    wherein a laterally outward protruding border of the plastic frame is encompassed by a section of the sealing element in a U-shaped manner, the sealing element having a circumferential sealing lip unitary one piece with the sealing element, and
    wherein said sealing lip is arranged on a side flank of the U-shaped sealing section and rising over the side flank,
a filter housing into which the filter element is arranged, and
a housing cover installable onto and removable from the filter housing,
wherein a side flank of the U-shaped sealing section of the sealing element abuts the filter housing and the sealing lip abuts the housing cover.

8. The air filter according to claim 7, wherein the wall of the filter housing has, adjacent to a front face, a laterally projecting support shoulder for accommodating a side flank of the U-shaped sealing section of the sealing element.

* * * * *